US011693982B2

(12) United States Patent
Bregman et al.

(10) Patent No.: US 11,693,982 B2
(45) Date of Patent: Jul. 4, 2023

(54) SYSTEMS FOR SECURE ENTERPRISE-WIDE FINE-GRAINED ROLE-BASED ACCESS CONTROL OF ORGANIZATIONAL ASSETS

(71) Applicant: ASG Technologies Group, Inc., Waltham, MA (US)

(72) Inventors: Yan Bregman, East Brunswick, NJ (US); Kizito Ofornagoro, Queens, NY (US)

(73) Assignee: ASG Technologies Group, Inc., Waltham, MA (US)

( * ) Notice: Subject to any disclaimer, the term of this patent is extended or adjusted under 35 U.S.C. 154(b) by 106 days.

(21) Appl. No.: 17/068,674

(22) Filed: Oct. 12, 2020

(65) Prior Publication Data

US 2021/0117517 A1 Apr. 22, 2021

Related U.S. Application Data

(60) Provisional application No. 62/923,381, filed on Oct. 18, 2019.

(51) Int. Cl.
*G06F 21/62* (2013.01)
*G06F 21/60* (2013.01)
(Continued)

(52) U.S. Cl.
CPC ........ *G06F 21/6218* (2013.01); *G06F 3/0482* (2013.01); *G06F 3/0483* (2013.01);
(Continued)

(58) Field of Classification Search
CPC .. G06F 21/6218; G06F 3/0482; G06F 3/0483; G06F 16/211; G06F 16/256;
(Continued)

(56) References Cited

U.S. PATENT DOCUMENTS 5,321,610 A 6/1994 Breslin
5,528,263 A 6/1996 Platzker et al.
(Continued)

FOREIGN PATENT DOCUMENTS

EP 3430529 A1 1/2019
EP 3714604 A1 9/2020
(Continued)

OTHER PUBLICATIONS

"International Search Report" and "Written Opinion of the International Searching Authority," Patent Cooperation Treaty Application No. PCT/US2021/054415, dated Jan. 19, 2022, 8 pages.
(Continued)

*Primary Examiner* — Badrinarayanan Champakesan
(74) *Attorney, Agent, or Firm* — Carr & Ferrell LLP

(57) ABSTRACT

The disclosure is directed to systems and methods for enterprise-wide fine-grained role-based access control to a plurality of organizational assets. In various embodiments exemplary methods include receiving, via an authorization service client API, identification of an asset for fine-grained role-based access control; a definition of an asset type of the asset; a definition of an asset value; receiving, a definition of an organizational role with fine-grained role-based access control to at least one of the asset, the asset type, and the asset value. Furthermore, receiving permissions for fine-grained role-based access by the organizational role to at least one of the asset, the asset type, and the asset value. Furthermore, the exemplary method may comprise providing an authorization service user interface (UI) for enabling fine-grained role-based access control to the asset based on the fine-grained role-based access control database schema.

14 Claims, 10 Drawing Sheets

(51) Int. Cl.
*G06F 40/106* (2020.01)
*G06F 3/0483* (2013.01)
*G06F 3/0482* (2013.01)
*G06F 16/25* (2019.01)
*G06F 21/31* (2013.01)
*H04L 9/40* (2022.01)
*G06F 16/21* (2019.01)
*G06N 5/01* (2023.01)

(52) U.S. Cl.
CPC ......... *G06F 16/211* (2019.01); *G06F 16/256* (2019.01); *G06F 21/31* (2013.01); *G06F 21/604* (2013.01); *G06F 40/106* (2020.01); *G06N 5/01* (2023.01); *H04L 63/101* (2013.01); *H04L 63/102* (2013.01); *H04L 63/105* (2013.01); *H04L 63/205* (2013.01); *G06F 2221/2141* (2013.01)

(58) Field of Classification Search
CPC ...... G06F 21/31; G06F 21/604; G06F 40/106; G06F 2221/2141; G06F 21/6209; G06F 21/6227; G06F 21/6245; G06N 5/003; G06N 5/04; H04L 63/101; H04L 63/102; H04L 63/105; H04L 63/205
USPC ............................................................. 726/7
See application file for complete search history.

(56) References Cited

U.S. PATENT DOCUMENTS

| | | | |
|---|---|---|---|
| 5,742,285 A | 4/1998 | Ueda | |
| 5,911,143 A * | 6/1999 | Deinhart | G06F 21/604 707/999.009 |
| 6,069,957 A | 5/2000 | Richards | |
| 6,208,345 B1 | 3/2001 | Sheard et al. | |
| 6,331,855 B1 | 12/2001 | Schauser | |
| 6,574,321 B1 | 6/2003 | Cox et al. | |
| 6,597,363 B1 | 7/2003 | Duluk | |
| 6,950,825 B2 * | 9/2005 | Chang | H04L 63/08 707/999.009 |
| 7,073,164 B1 | 7/2006 | Knowles | |
| 7,185,192 B1 * | 2/2007 | Kahn | G06F 21/6218 707/999.102 |
| 7,359,076 B2 | 4/2008 | Uchino | |
| 7,937,665 B1 | 5/2011 | Vazquez et al. | |
| 8,078,731 B1 | 12/2011 | Bruder et al. | |
| 8,667,456 B1 | 3/2014 | Czymontek | |
| 8,745,011 B2 | 6/2014 | Kishi | |
| 9,032,076 B2 * | 5/2015 | Buehler | H04L 63/105 726/4 |
| 9,053,295 B1 | 6/2015 | Wick et al. | |
| 9,213,707 B2 | 12/2015 | Conner | |
| 9,232,491 B2 | 1/2016 | Mahaffey | |
| 9,430,125 B1 | 8/2016 | Blitzer et al. | |
| 9,483,537 B1 | 11/2016 | Peters et al. | |
| 9,621,428 B1 | 4/2017 | Lev et al. | |
| 9,910,655 B1 | 3/2018 | Ranganathan et al. | |
| 10,162,624 B1 | 12/2018 | Moturu et al. | |
| 10,181,059 B1 | 1/2019 | Brewton et al. | |
| 10,318,762 B1 | 6/2019 | Buckingham et al. | |
| 10,348,505 B1 | 7/2019 | Crawforth et al. | |
| 10,355,864 B2 | 7/2019 | Konduru | |
| 10,812,611 B2 | 10/2020 | Bennet et al. | |
| 10,877,740 B2 | 12/2020 | Bennet et al. | |
| 10,990,689 B1 | 4/2021 | Reiner et al. | |
| 11,055,067 B2 | 7/2021 | Thangaraj et al. | |
| 11,057,500 B2 | 7/2021 | Aragón et al. | |
| 11,086,751 B2 | 8/2021 | Moresmau et al. | |
| 11,172,042 B2 | 11/2021 | Bennet et al. | |
| 11,269,660 B2 | 3/2022 | Yueh | |
| 2002/0099952 A1 | 7/2002 | Lambert et al. | |
| 2002/0103731 A1 | 8/2002 | Barnard et al. | |
| 2002/0184610 A1 | 12/2002 | Chong et al. | |
| 2002/0196277 A1 | 12/2002 | Bushey et al. | |
| 2003/0046401 A1 | 3/2003 | Abbott et al. | |
| 2003/0079052 A1 | 4/2003 | Kushnirskiy | |
| 2004/0003119 A1 | 1/2004 | Munir et al. | |
| 2004/0003371 A1 | 1/2004 | Coulthard et al. | |
| 2004/0078373 A1 | 4/2004 | Ghoneimy et al. | |
| 2004/0128001 A1 | 7/2004 | Levin et al. | |
| 2004/0153994 A1 | 8/2004 | Bates et al. | |
| 2004/0177323 A1 | 9/2004 | Kaasila et al. | |
| 2004/0267749 A1 | 12/2004 | Bhat et al. | |
| 2005/0038764 A1 | 2/2005 | Minsky et al. | |
| 2005/0065845 A1 | 3/2005 | DeAngelis | |
| 2005/0108526 A1 * | 5/2005 | Robertson | H04L 63/105 713/166 |
| 2005/0235258 A1 | 10/2005 | Wason | |
| 2005/0278695 A1 | 12/2005 | Synovic | |
| 2006/0026591 A1 | 2/2006 | Backhouse | |
| 2006/0029659 A1 | 2/2006 | Backhouse | |
| 2006/0031854 A1 | 2/2006 | Godwin | |
| 2006/0036448 A1 | 2/2006 | Haynie et al. | |
| 2006/0036941 A1 | 2/2006 | Neil | |
| 2006/0039466 A1 | 2/2006 | Emerson et al. | |
| 2006/0111888 A1 | 5/2006 | Hiew et al. | |
| 2006/0129817 A1 * | 6/2006 | Borneman | H04L 67/53 713/170 |
| 2006/0184925 A1 | 8/2006 | Ficatier et al. | |
| 2006/0251047 A1 | 11/2006 | Shenfield et al. | |
| 2006/0265719 A1 | 11/2006 | Asti | |
| 2006/0271528 A1 | 11/2006 | Gorelik | |
| 2006/0294151 A1 | 12/2006 | Wong | |
| 2007/0016624 A1 | 1/2007 | Powers et al. | |
| 2007/0028286 A1 | 2/2007 | Greene et al. | |
| 2007/0033637 A1 | 2/2007 | Yami et al. | |
| 2007/0073671 A1 | 3/2007 | McVeigh et al. | |
| 2007/0094594 A1 | 4/2007 | Matichuk | |
| 2007/0135936 A1 | 6/2007 | Dumas | |
| 2007/0156764 A1 | 7/2007 | O'Connell et al. | |
| 2007/0180367 A1 | 8/2007 | Chiang | |
| 2007/0180444 A1 | 8/2007 | Hoover et al. | |
| 2007/0198450 A1 | 8/2007 | Khalsa | |
| 2007/0208685 A1 | 9/2007 | Blumenau | |
| 2007/0266394 A1 | 11/2007 | Odent et al. | |
| 2007/0294406 A1 | 12/2007 | Suer et al. | |
| 2008/0109292 A1 | 5/2008 | Moore | |
| 2008/0120302 A1 * | 5/2008 | Thompson | G06F 21/6209 707/999.009 |
| 2008/0126932 A1 | 5/2008 | Elad et al. | |
| 2008/0141141 A1 | 6/2008 | Moore | |
| 2008/0189617 A1 | 8/2008 | Covell et al. | |
| 2008/0209390 A1 | 8/2008 | Dutta et al. | |
| 2008/0229303 A1 | 9/2008 | Carteri et al. | |
| 2008/0281727 A1 | 11/2008 | Moss | |
| 2009/0024589 A1 | 1/2009 | Sood | |
| 2009/0024660 A1 | 1/2009 | Borgsmidt et al. | |
| 2009/0025063 A1 | 1/2009 | Thomas | |
| 2009/0083306 A1 | 3/2009 | Sichi et al. | |
| 2009/0094112 A1 | 4/2009 | Cesarini et al. | |
| 2009/0124387 A1 | 5/2009 | Perlman et al. | |
| 2009/0249290 A1 | 10/2009 | Jenkins et al. | |
| 2009/0249446 A1 | 10/2009 | Jenkins et al. | |
| 2010/0030890 A1 | 2/2010 | Dutta et al. | |
| 2010/0106560 A1 | 4/2010 | Li et al. | |
| 2010/0114628 A1 | 5/2010 | Adler et al. | |
| 2010/0131857 A1 | 5/2010 | Prigge | |
| 2010/0153866 A1 | 6/2010 | Sharoni | |
| 2010/0169265 A1 | 7/2010 | Ristock et al. | |
| 2010/0225658 A1 | 9/2010 | Coleman | |
| 2010/0226441 A1 | 9/2010 | Tung et al. | |
| 2010/0231599 A1 | 9/2010 | Tung et al. | |
| 2010/0245563 A1 | 9/2010 | Golovchinsky et al. | |
| 2010/0250497 A1 | 9/2010 | Redlich et al. | |
| 2010/0274815 A1 | 10/2010 | Vanasco | |
| 2011/0004564 A1 | 1/2011 | Rolia et al. | |
| 2011/0029947 A1 | 2/2011 | Markovic | |
| 2011/0078708 A1 | 3/2011 | Dokovski et al. | |
| 2011/0107298 A1 | 5/2011 | Sebastian | |
| 2011/0107309 A1 | 5/2011 | Baron | |
| 2011/0107313 A1 | 5/2011 | Baron | |
| 2011/0246904 A1 | 10/2011 | Pinto et al. | |

(56) References Cited

U.S. PATENT DOCUMENTS

| | | |
|---|---|---|
| 2011/0276636 A1 | 11/2011 | Cheng et al. |
| 2012/0072509 A1 | 3/2012 | Booth |
| 2012/0075333 A1 | 3/2012 | Chen et al. |
| 2012/0130906 A1 | 5/2012 | Klinker |
| 2012/0310381 A1 | 12/2012 | Karaffa |
| 2012/0310875 A1 | 12/2012 | Prahlad et al. |
| 2012/0324358 A1 | 12/2012 | Jooste |
| 2012/0331527 A1 | 12/2012 | Walters et al. |
| 2013/0031158 A1 | 1/2013 | Salsburg |
| 2013/0117662 A1 | 5/2013 | Shan et al. |
| 2013/0151557 A1 | 6/2013 | Shanken et al. |
| 2013/0174028 A1 | 7/2013 | Grossman et al. |
| 2013/0177662 A1 | 7/2013 | Msika |
| 2013/0275475 A1 | 10/2013 | Ahlborn |
| 2013/0332423 A1 | 12/2013 | Puri et al. |
| 2013/0339872 A1 | 12/2013 | Shuster |
| 2014/0026113 A1 | 1/2014 | Farooqi |
| 2014/0032875 A1 | 1/2014 | Butler |
| 2014/0047011 A1 | 2/2014 | Lahav et al. |
| 2014/0047413 A1 | 2/2014 | Sheive et al. |
| 2014/0075407 A1 | 3/2014 | Donis et al. |
| 2014/0089388 A1 | 3/2014 | Curry et al. |
| 2014/0114907 A1 | 4/2014 | Kozina et al. |
| 2014/0114962 A1 | 4/2014 | Rosenburg et al. |
| 2014/0207575 A1 | 7/2014 | Freed-Finnegan et al. |
| 2014/0245199 A1 | 8/2014 | Belotti et al. |
| 2014/0282453 A1 | 9/2014 | O'Rourke et al. |
| 2014/0288923 A1 | 9/2014 | Marian et al. |
| 2014/0288945 A1 | 9/2014 | Boerner et al. |
| 2014/0380105 A1 | 12/2014 | Michel et al. |
| 2015/0006543 A1 | 1/2015 | Jin et al. |
| 2015/0012478 A1 | 1/2015 | Mohammad et al. |
| 2015/0046930 A1 | 2/2015 | Phadke |
| 2015/0088933 A1 | 3/2015 | Schofield et al. |
| 2015/0127660 A1 | 5/2015 | Zilberberg et al. |
| 2015/0128105 A1 | 5/2015 | Sethi et al. |
| 2015/0248280 A1 | 9/2015 | Pillay |
| 2015/0293764 A1 | 10/2015 | Visvanathan |
| 2015/0379303 A1 | 12/2015 | LaFever et al. |
| 2016/0026968 A1 | 1/2016 | Fan et al. |
| 2016/0034260 A1 | 2/2016 | Ristock et al. |
| 2016/0034571 A1 | 2/2016 | Setayesh et al. |
| 2016/0044380 A1 | 2/2016 | Barrett |
| 2016/0070541 A1 | 3/2016 | Lee et al. |
| 2016/0112453 A1* | 4/2016 | Martinez ............... H04L 63/20 726/1 |
| 2016/0117159 A1 | 4/2016 | Balko |
| 2016/0140204 A1 | 5/2016 | Brown et al. |
| 2016/0253340 A1 | 9/2016 | Barth et al. |
| 2016/0267060 A1 | 9/2016 | Skirpa et al. |
| 2016/0267082 A1 | 9/2016 | Wong et al. |
| 2016/0275439 A1 | 9/2016 | Avats |
| 2016/0283200 A1 | 9/2016 | Standley et al. |
| 2016/0299933 A1 | 10/2016 | Fillipi et al. |
| 2016/0359711 A1 | 12/2016 | Deen et al. |
| 2017/0034306 A1 | 2/2017 | Thangeswaran |
| 2017/0039041 A1 | 2/2017 | Bommireddi |
| 2017/0068395 A1 | 3/2017 | Massoudi |
| 2017/0118284 A1 | 4/2017 | Chen et al. |
| 2017/0123751 A1 | 5/2017 | Sigurdsson et al. |
| 2017/0154026 A1 | 6/2017 | Gong et al. |
| 2017/0180284 A1 | 6/2017 | Smullen et al. |
| 2017/0199936 A1 | 7/2017 | Steelberg et al. |
| 2017/0228119 A1 | 8/2017 | Hosbettu et al. |
| 2017/0269972 A1 | 9/2017 | Hosabettu et al. |
| 2017/0270022 A1 | 9/2017 | Moresmau et al. |
| 2017/0339564 A1 | 11/2017 | Momchilov et al. |
| 2017/0344227 A1 | 11/2017 | Stoicov et al. |
| 2017/0357814 A1 | 12/2017 | Mahaffey et al. |
| 2017/0372442 A1 | 12/2017 | Mejias |
| 2018/0089005 A1 | 3/2018 | Green |
| 2018/0121841 A1 | 5/2018 | Harris |
| 2018/0129497 A1 | 5/2018 | Biddle et al. |
| 2018/0167426 A1 | 6/2018 | Sigurdsson et al. |
| 2018/0174104 A1 | 6/2018 | Schikora et al. |
| 2018/0191761 A1 | 7/2018 | Lee et al. |
| 2018/0197123 A1 | 7/2018 | Parimelazhagan et al. |
| 2018/0322396 A1 | 11/2018 | Ahuja-Cogny et al. |
| 2018/0341573 A1 | 11/2018 | Patel |
| 2018/0367506 A1 | 12/2018 | Ford et al. |
| 2019/0081935 A1 | 3/2019 | Broussard et al. |
| 2019/0129734 A1 | 5/2019 | Yang et al. |
| 2019/0158630 A1 | 5/2019 | Aragón et al. |
| 2019/0196793 A1 | 6/2019 | Jaiprakash |
| 2019/0205111 A1 | 7/2019 | Bennet et al. |
| 2019/0205403 A1 | 7/2019 | Hussain et al. |
| 2019/0208031 A1 | 7/2019 | Bennet et al. |
| 2019/0238467 A1 | 8/2019 | Guan et al. |
| 2019/0238688 A1 | 8/2019 | Bermundo et al. |
| 2019/0243742 A1 | 8/2019 | Natari |
| 2019/0332357 A1 | 10/2019 | Reddy |
| 2019/0342404 A1 | 11/2019 | Kundu et al. |
| 2019/0369969 A1 | 12/2019 | Donohoe et al. |
| 2020/0026735 A1 | 1/2020 | Przada |
| 2020/0042648 A1 | 2/2020 | Rao |
| 2020/0050983 A1 | 2/2020 | Balasubramanian et al. |
| 2020/0133982 A1 | 4/2020 | Thangeswaran et al. |
| 2020/0134374 A1 | 4/2020 | Oros |
| 2020/0348964 A1 | 11/2020 | Anand et al. |
| 2020/0356365 A1 | 11/2020 | Pezaris |
| 2020/0409665 A1 | 12/2020 | Swaminathan et al. |
| 2021/0004711 A1 | 1/2021 | Gupta et al. |
| 2021/0006596 A1 | 1/2021 | Beredimas et al. |
| 2021/0019574 A1 | 1/2021 | Voicu |
| 2021/0037110 A1 | 2/2021 | Bennet et al. |
| 2021/0092154 A1 | 3/2021 | Kumar et al. |
| 2021/0094176 A1 | 4/2021 | Rusanu |
| 2021/0107164 A1 | 4/2021 | Singh et al. |
| 2021/0109503 A1 | 4/2021 | Singh et al. |
| 2021/0109742 A1 | 4/2021 | Bennet et al. |
| 2021/0110345 A1 | 4/2021 | Iyer et al. |
| 2021/0117162 A1 | 4/2021 | Thangaraj et al. |
| 2021/0117210 A1 | 4/2021 | Yueh |
| 2021/0117302 A1 | 4/2021 | Kadakia et al. |
| 2021/0117394 A1 | 4/2021 | Moresmau et al. |
| 2021/0117562 A1 | 4/2021 | Balan et al. |
| 2021/0117563 A1 | 4/2021 | Moresmau et al. |
| 2021/0117895 A1 | 4/2021 | Tondevold et al. |
| 2021/0120044 A1 | 4/2021 | Balan et al. |
| 2021/0194994 A1 | 6/2021 | Aragón et al. |
| 2021/0286597 A1 | 9/2021 | Thangaraj et al. |
| 2021/0342900 A1 | 11/2021 | Memon |
| 2021/0357503 A1 | 11/2021 | Moresmau et al. |
| 2022/0060558 A1 | 2/2022 | Bennet et al. |
| 2022/0067731 A1 | 3/2022 | Palaniappan et al. |
| 2022/0114267 A1 | 4/2022 | Schwartz et al. |
| 2022/0116787 A1 | 4/2022 | Balan et al. |

FOREIGN PATENT DOCUMENTS

| | | |
|---|---|---|
| EP | 3732566 | 11/2020 |
| EP | 3732582 | 11/2020 |
| EP | 3991025 A1 | 5/2022 |
| WO | WO2008003593 A1 | 1/2008 |
| WO | WO2015139119 A1 | 9/2015 |
| WO | WO2015154133 A1 | 10/2015 |
| WO | WO2017147694 A1 | 9/2017 |
| WO | WO2017160831 A1 | 9/2017 |
| WO | WO2019099140 A1 | 5/2019 |
| WO | WO2019133208 A1 | 7/2019 |
| WO | WO2019133209 A1 | 7/2019 |
| WO | WO2020263573 A1 | 12/2020 |
| WO | WO2021076310 A1 | 4/2021 |
| WO | WO2021076311 A1 | 4/2021 |
| WO | WO2021076312 A1 | 4/2021 |
| WO | WO2021076324 A1 | 4/2021 |
| WO | WO2021076520 A1 | 4/2021 |
| WO | WO2021076521 A1 | 4/2021 |
| WO | WO2021076791 A1 | 4/2021 |
| WO | WO2021076921 A1 | 4/2021 |

(56) References Cited

FOREIGN PATENT DOCUMENTS

| WO | WO2022081475 A1 | 4/2022 |
|----|-----------------|--------|
| WO | WO2022081476 A1 | 4/2022 |

OTHER PUBLICATIONS

Kuligowski, Kiely; "What is a Document Repository?" business.com. [Retrieved on Dec. 12, 2021]; <URL: https://www.business.com/articles/what-is-document-repository/>, Jun. 25, 2020, 10 pages.
"International Search Report" and "Written Opinion of the International Searching Authority," Patent Cooperation Treaty Application No. PCT/US2021/054416, dated Jan. 19, 2022, 9 pages.
"Office Action," European Application No. 18879227.9, dated Apr. 21, 2022, 12 pages.
Choudhri et al., "PatientService: Electronic Patient Record Redaction and Delivery in Pervasive Environments." Proceedings 5th International Workshop on Enterprise Networking and Computing in Healthcare Industry (HealthCom), IEEE, Jul. 2003, 7 pages.
Romao et al., "Robotic Process Automation: A Case Study in the Banking Industry," 2019 14th Iberian Conference on Information Systems and Technologies, Jun. 19-22, 2019, 6 pages.
"International Search Report" and "Written Opinion of the International Searching Authority," Patent Cooperation Treaty Application No. PCT/US2017/022295, dated Jun. 1, 2017, 9 pages.
"International Search Report" and "Written Opinion of the International Searching Authority," Patent Cooperation Treaty Application No. PCT/US2018/056196, dated Dec. 26, 2018, 8 pages.
"International Search Report" and "Written Opinion of the International Searching Authority," Patent Cooperation Treaty Application No. PCT/US2018/064127, dated Feb. 11, 2019, 6 pages.
"International Search Report" and "Written Opinion of the International Searching Authority," Patent Cooperation Treaty Application No. PCT/US2018/064122, dated Mar. 18, 2019, 8 pages.
"Extended European Search Report" and "Written Opinion", European Application No. 17767331.6, dated Nov. 14, 2019, 6 pages.
"International Search Report" and "Written Opinion of the International Searching Authority," Patent Cooperation Treaty Application No. PCT/US2020/037028, dated Aug. 28, 2020, 13 pages.
"International Search Report" and "Written Opinion of the International Searching Authority," Patent Cooperation Treaty Application No. PCT/US2020/053141, dated Jan. 12, 2021, 8 pages.
"International Search Report" and "Written Opinion of the International Searching Authority," Patent Cooperation Treaty Application No. PCT/US2020/053419, dated Jan. 14, 2021, 14 pages.
"International Search Report" and "Written Opinion of the International Searching Authority," Patent Cooperation Treaty Application No. PCT/US2020/053138, dated Jan. 12, 2021, 8 pages.
"International Search Report" and "Written Opinion of the International Searching Authority," Patent Cooperation Treaty Application No. PCT/US2020/053139, dated Jan. 11, 2021, 8 pages.
"International Search Report" and "Written Opinion of the International Searching Authority," Patent Cooperation Treaty Application No. PCT/US2020/056026, dated Jan. 19, 2021, 16 pages.
"International Search Report" and "Written Opinion of the International Searching Authority," Patent Cooperation Treaty Application No. PCT/US2020/055829, dated Jan. 19, 2021, 18 pages.
"International Search Report" and "Written Opinion of the International Searching Authority," Patent Cooperation Treaty Application No. PCT/US2020/055418, dated Jan. 28, 2021, 8 pages.
"International Search Report" and "Written Opinion of the International Searching Authority," Patent Cooperation Treaty Application No. PCT/US2020/055420, dated Feb. 1, 2021, 8 pages.
Bourgouin et al., "Towards a Process Analysis Approach to Adopt Robotic Process Automation", IEEE, 2018, 8 pages.
"Extended European Search Report" and "Written Opinion", European Application No. 18879227.9, dated Mar. 15, 2021, 9 pages.
"Extended European Search Report" and "Written Opinion", European Application No. 18895108.1, dated Aug. 19, 2021, 8 pages.
"Extended European Search Report" and "Written Opinion", European Application No. 18895245.1, dated Aug. 25, 2021, 8 pages.

* cited by examiner

```
                                      600
                                       ↙
┌─────────────────────────────────────────────────┐
│  RECEIVING, VIA AN AUTHORIZATION SERVICE CLIENT │
│  APPLICATION PROGRAMING INTERFACE (API),        │
│  IDENTIFICATION OF AN ASSET FOR FINE-GRAINED    │
│  ROLE-BASED ACCESS CONTROL FROM AN ORGANIZATION │
│                      605                         │
└─────────────────────────────────────────────────┘
                        ▼
┌─────────────────────────────────────────────────┐
│  RECEIVING, VIA THE AUTHORIZATION SERVICE CLIENT│
│  APPLICATION PROGRAMING INTERFACE (API), A      │
│  DEFINITION OF AN ASSET TYPE OF THE ASSET USING │
│  THE IDENTIFICATION OF THE ASSET                │
│                      610                         │
└─────────────────────────────────────────────────┘
                        ▼
┌─────────────────────────────────────────────────┐
│  RECEIVING, VIA THE AUTHORIZATION SERVICE CLIENT│
│  APPLICATION PROGRAMING INTERFACE (API), A      │
│  DEFINITION OF AN ASSET VALUE OF THE ASSET      │
│  BASED ON THE ASSET TYPE                        │
│                      615                         │
└─────────────────────────────────────────────────┘
                        ▼
┌─────────────────────────────────────────────────┐
│  RECEIVING, VIA THE AUTHORIZATION SERVICE CLIENT│
│  APPLICATION PROGRAMING INTERFACE (API), A      │
│  DEFINITION OF AN ORGANIZATIONAL ROLE WITH      │
│  FINE-GRAINED ROLE-BASED ACCESS CONTROL TO AT   │
│  LEAST ONE OF THE ASSET, THE ASSET TYPE, THE    │
│  ASSET VALUE                                     │
│                      620                         │
└─────────────────────────────────────────────────┘
                        ▼
┌─────────────────────────────────────────────────┐
│  RECEIVING, VIA THE AUTHORIZATION SERVICE CLIENT│
│  APPLICATION PROGRAMING INTERFACE (API),        │
│  PERMISSIONS FOR FINE-GRAINED ROLE-BASED ACCESS │
│  BY THE ORGANIZATIONAL ROLE TO AT LEAST ONE OF  │
│  THE ASSET, THE ASSET TYPE, THE ASSET VALUE     │
│                      625                         │
└─────────────────────────────────────────────────┘
                        ▼
┌─────────────────────────────────────────────────┐
│  GENERATING A FINE-GRAINED ROLE-BASED ACCESS    │
│  CONTROL DATABASE SCHEMA USING THE ASSET, THE   │
│  DEFINITION OF AN ASSET TYPE, THE DEFINITION OF │
│  AN ASSET VALUE, THE DEFINITION OF AN           │
│  ORGANIZATIONAL ROLE, AND THE PERMISSIONS FOR   │
│  FINE-GRAINED ROLE-BASED ACCESS BY THE          │
│  ORGANIZATIONAL ROLE TO AT LEAST ONE OF THE     │
│  ASSET, THE ASSET TYPE, THE ASSET VALUE;        │
│                      630                         │
└─────────────────────────────────────────────────┘
                        ▼
┌─────────────────────────────────────────────────┐
│  PROVIDING AN AUTHORIZATION SERVICE USER        │
│  INTERFACE (UI) FOR ENABLING FINE-GRAINED       │
│  ROLE-BASED ACCESS CONTROL TO THE ASSET BASED   │
│  ON THE FINE-GRAINED ROLE-BASED ACCESS CONTROL  │
│  DATABASE SCHEMA                                │
│                      635                         │
└─────────────────────────────────────────────────┘
                        ▼
┌─────────────────────────────────────────────────┐
│  RECEIVING, VIA AN AUTHORIZATION SERVICE CLIENT │
│  APPLICATION PROGRAMING INTERFACE (API), A      │
│  REQUEST FOR PERMISSION TO ACCESS AT LEAST ONE  │
│  OF THE ASSET, THE ASSET TYPE, THE ASSET VALUE  │
│  BY AN AUTHENTICATED USER.                      │
│                      640                         │
└─────────────────────────────────────────────────┘
```

FIG. 6

APPLICATION BOOTSTRAPPING

SPRING STARTER MODULE AUTO-REGISTERS ON HOST APPLICATION-STARTUP EVENT AND ASSIGNS ROOT ROLE

800

PERMISSIONS TEMPLATE FOR REGISTRATION
810 sample/auth/authorization-manifest-template.yaml

```
 1  ---
 2  applicationName:
 3  description:
 4  assetTypes:
 5    - name:
 6      description:
 7    - name:
 8      description:
 9  permissions:
10    - name:
11      assetType:
12      description:
13    - name:
14      assetType:
15      description:
```

EXAMPLE
820 auth/authorization-manifest-example.yaml

```
 1  ---
 2  applicationName: VDR
 3  description: VDRNET application
 4  assetTypes:
 5    - name: Report
 6      description: Permits reading VDR reports
 7    - name: Topic
 8      description: Permits reading VDR reports
 9  permissions:
10    - name: readReport
11      assetType: Report
12      description: Permits reading VDR reports
13    - name: writeReport
14      assetType: Report
15      description: Permits writing VDR reports
16    - name: readTopic
17      assetType: Topic
18      description: Permits reading VDR reports
19    - name: writeTopic
20      description: Topic
21      description: Permits writing VDR reports
```

FIG. 8

SYSTEMS FOR SECURE ENTERPRISE-WIDE FINE-GRAINED ROLE-BASED ACCESS CONTROL OF ORGANIZATIONAL ASSETS

CROSS REFERENCE TO RELATED APPLICATION

This application claims the priority benefit of U.S. Provisional Patent Application Ser. No. 62/923,381 filed on Oct. 18, 2019, which is hereby incorporated by reference for all purposes.

FIELD OF THE TECHNOLOGY

Embodiments of the disclosure relate to a rule-based engine. In particular, the present disclosure relates to systems and methods for secure enterprise-wide fine-grained role-based access control of organizational assets.

SUMMARY OF THE INVENTION

This summary is provided to introduce a selection of concepts in a simplified form that are further described in the Detailed Description below. This summary is not intended to identify key or essential features of the claimed subject matter, nor is it intended to be used as an aid in determining the scope of the claimed subject matter.

In some embodiments, the present disclosure is directed to a system of one or more computers which can be configured to perform particular operations or actions by virtue of having software, firmware, hardware, or a combination thereof installed on the system that in operation causes or cause the system to perform actions and/or method steps as described herein.

Embodiments of the present technology are directed to systems and methods for enterprise-wide fine-grained role-based access control to a plurality of organizational assets. An exemplary method includes: receiving, via an authorization service client Application Programming Interface (API), identification of an asset for fine-grained role-based access control from an organization; receiving, via the authorization service client API, a definition of an asset type of the asset using the identification of the asset; and receiving, via the authorization service client API, a definition of an asset value of the asset based on the asset type. The exemplary method may further include receiving, via the authorization service client API, a definition of an organizational role with fine-grained role-based access control to at least one of the asset, the asset type, and the asset value; receiving, via the authorization service client API, permissions for fine-grained role-based access by the organizational role to at least one of the asset, the asset type, and the asset value; and generating a fine-grained role-based access control database schema using the asset, the definition of an asset type, the definition of an asset value, the definition of an organizational role, and the permissions for fine-grained role-based access by the organizational role to at least one of the asset, the asset type, and the asset value. The exemplary method may also include providing an authorization service user interface (UI) for enabling fine-grained role-based access control to the asset based on the fine-grained role-based access control database schema; and receiving, via the authorization service client API, a request for permission to access at least one of the asset, the asset type, and the asset value by an authenticated user.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments. Embodiments are illustrated by way of example and not limitation in the figures of the accompanying drawings.

FIG. 6 illustrates a process flow diagram showing a method for enterprise-wide fine-grained role-based access control to a plurality of organizational assets, in accordance with exemplary embodiments of the present technology.

FIG. 8 illustrates documentation of an authorization service client API for enterprise-wide fine-grained role-based access control to a plurality of organizational assets, in accordance with exemplary embodiments of the present technology.

DETAILED DESCRIPTION

Figure 1:
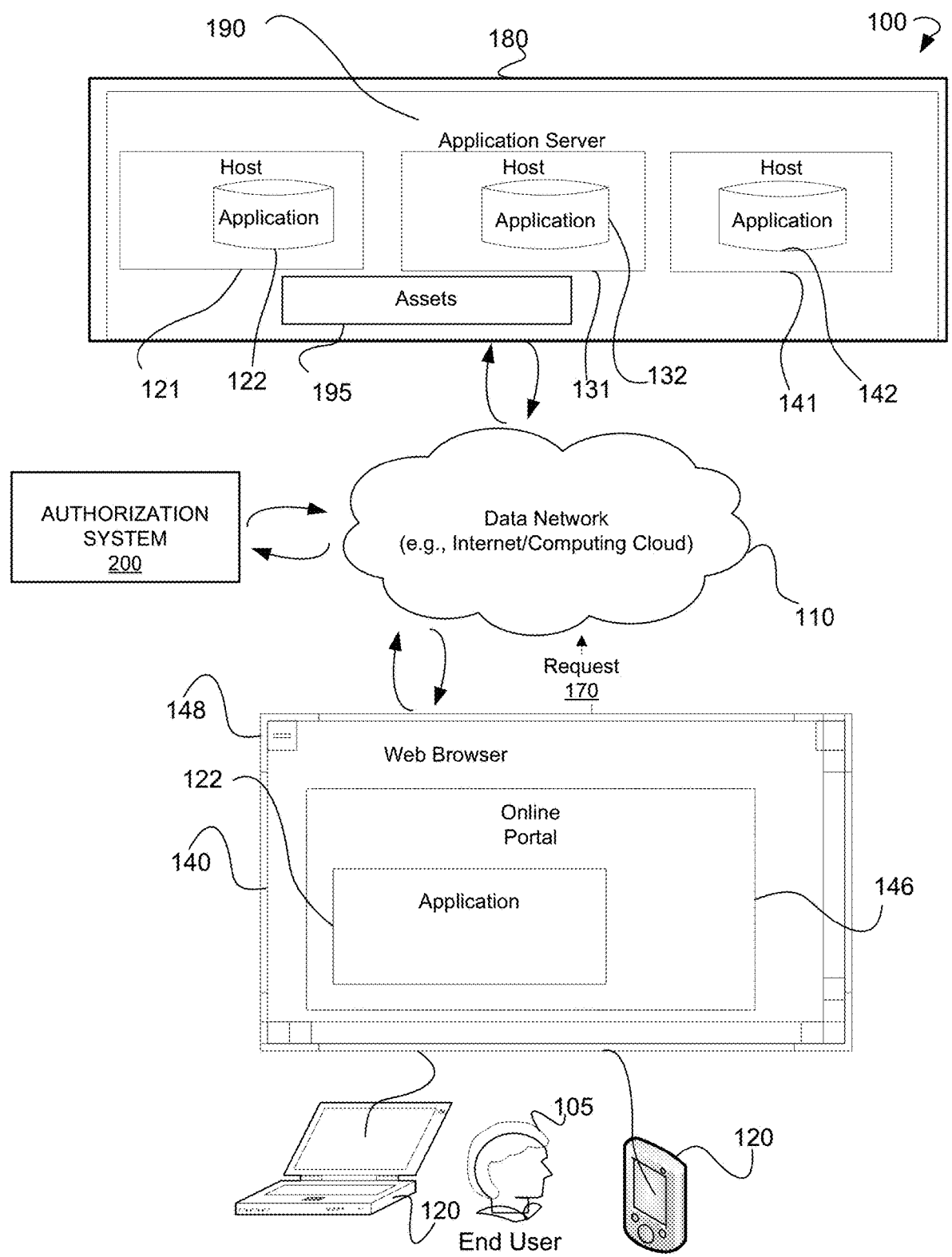
FIG. 1 illustrates an environment within which methods and systems for enterprise-wide fine-grained role-based access control to a plurality of organizational assets can be implemented, in accordance with exemplary embodiments of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Role-Based Access Control (RBAC) is a method of restricting access based on the roles of individual users within enterprise-wide applications. For example, RBAC allows employees to only have access rights to information necessary for their job and prevents employees from accessing other information. Using RBAC, the role of an employee role in an organization (i.e., organizational role of an employee) determines the permissions for information that employee is granted. For example, RBAC ensures that lower-level employees do not have access to sensitive information or perform high-level tasks. One of the benefits of using RBAC is decreasing risk of breaches and data leakage. For example, implementing RBAC for an organization means restricting access to sensitive information, thus, decreasing risk of breaches and data leakage for the organization.

Modern access control systems are either too rigid or too coarse-grained for many enterprise-wide applications. Attempts to address such limitations typically require combining multiple access control systems which results in highly complex and costly implementation often targeted to a narrow use case. A better approach enabled by the present technology is to first identify constituent elements of a target for access control. Next, targets are then identified as assets thus facilitating categorization and grouping as asset types. An asset may then exhibit attributes including asset values, used to identify constituent elements of the asset. An asset may be any data, device, or other component of the environment that supports information-related activities. For example, assets include hardware (e.g. servers and switches), software (e.g. mission critical applications and support systems), and confidential information. Assets may be entities in an application of a user that require authorization constraints. Organizations control access to assets to protect assets from illicit access, use, disclosure, alteration, destruction, and theft, to prevent loss to the organization.

Various embodiments of the present technology enable Fine-grained Role-Based Access Control (FgRBAC) for the protection of assets. With FgRBAC, asset type, asset, and asset value become a set of variables that can be used to express an access rule. The FgRBAC concept of permission is the access rule, which can be granted to a role. A role can be assigned to a subject (i.e., user) or a group of subjects.

In various embodiments of the present technology, an asset is an application object, a resource, or an operation that requires access control. An asset has a type. For example, a document (e.g., an object) can be a report (e.g., report type) or an invoice (e.g., invoice type). An asset value is a constituent part of an asset. For example, the asset values in a report may include lines, words, sections, pages, paragraphs, characters, or any identifiable item or artifact of that report. The FgRBAC model can be used with any real asset, resource, or service where access control is required. For example, if certain employees can make color prints (e.g., asset value) on a particular printer (e.g., asset) at a particular time slot (e.g., asset value) of the day, only if they are from a certain geographical location (asset value) then the effective permission (to print) is the result of applying the permission's reduce operator on all attributes of the asset (printer). A single FgRBAC permission is constrained to a set comprised of attributes on an asset, any combination of assets of that type, and any combination of asset values for individual assets in the set. A set of all attributes or a subset of the attributes of an asset is a monoid under Boolean operation AND. As a monoid the identity element is the asset type and is always present in the set. If multiple roles are assigned to a subject, then the effective permissions are a set of permissions resulting from a binary relation on the roles' permissions where no permission with same identity element is repeated. FgRBAC can be used to define complex rules for asset specifications. The rules can be used to enable or exclude access to any combination of assets.

Referring now to the drawings, FIG. 1 illustrates an environment 100 within which methods and systems for enterprise-wide fine-grained role-based access control to a plurality of organizational assets can be implemented, in accordance with exemplary embodiments of the present technology. The environment 100 may include a data network 110 (e.g., an Internet or a computing cloud), an end user 105, a client device 120 shown as a laptop or a smartphone associated with the end user 105, an enterprise system 180, and an authorization system 200 for enterprise-wide fine-grained role-based access control to a plurality of organizational assets. The enterprise system 180 may include an application server 190 and assets 195. The application server 190 may have a plurality of hosts 121, 131, 141 for a plurality of applications 122, 132, 142. The client device 120 may have a User Interface (UI) 148. Furthermore, a web browser 140 may be running on the client device 120 and may be displayed using the User Interface (UI) 148. The web browser 140 may communicate with the application server 190 and the authorization system 200 via the data network 110. The authorization system 200 is described with additional detail in FIG. 2.

The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

According to various embodiments, the web browser 140 may display a web page associated with an online portal 146. The online portal 146 may include a workspace portal that contains a plurality of applications 122, 132, 142 running on the application server 190. The web browser 140 may establish a communication channel with the application server 190 and the authorization system 200 and may generate and render virtual screens based on data received from the application server 190 and the authorization system 200. Specifically, the web browser 140 may display the generated virtual screens of one of the applications 122, 132, 142, such as the application 122 to the end user 105.

According to some embodiments, the end user 105 may send a request 170 to the application server 190 and/or the authorization system 200 using the client device 120. In some instances, the application server 190 may forward the request 170 to the authorization system 200. The request 170 may include a request to access the assets 195. In response to the request 170, the authorization system 200 may reply to the request 170 and provide enterprise-wide fine-grained role-based access control to the assets 195. In some instances, the replying to the request for permission to access at least one of the asset, the asset type, and the asset value by the authenticated user (e.g., request 170) may comprise granting permission to access at least one of the asset, the asset type, and the asset value by the authenticated user. For example, the application 122 and the assets 195 may be rendered by the web browser 140 when access is provided by the authorization system 200 to the assets 195. In some instances, the replying to the request for permission to access at least one of the asset, the asset type, and the asset value by the authenticated user (e.g., request 170) may comprise denial of permission to access at least one of the asset, the asset type, and the asset value by the authenticated user.

Figure 2:
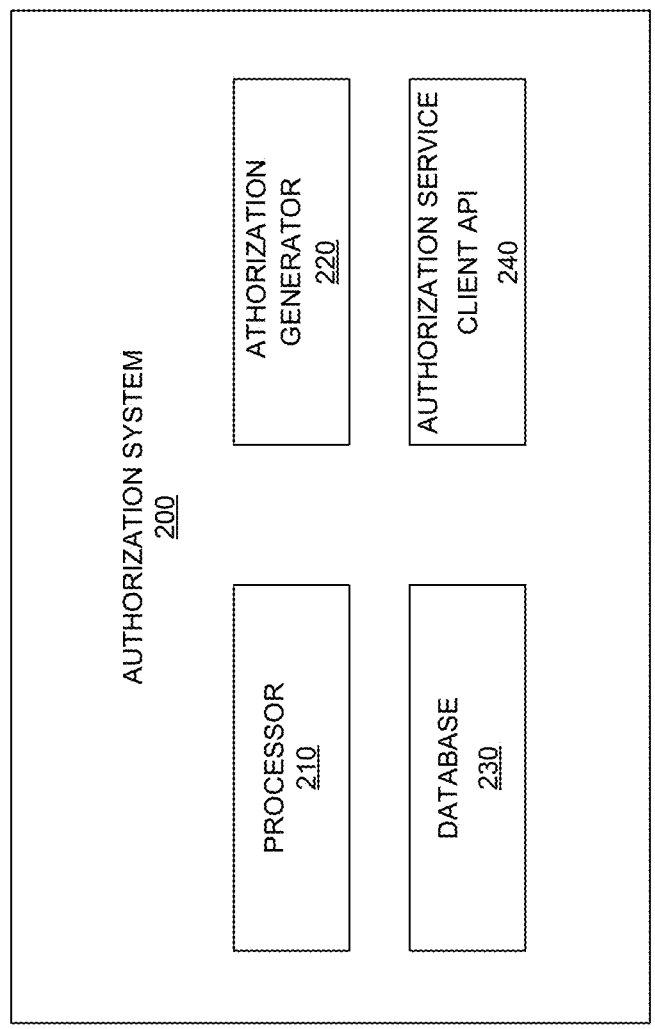
FIG. 2 shows a block diagram of the authorization system for enterprise-wide fine-grained role-based access control to a plurality of organizational assets, in accordance with exemplary embodiments of the present technology.

FIG. 2 shows a block diagram of the authorization system 200 for enterprise-wide fine-grained role-based access control to a plurality of organizational assets, in accordance with exemplary embodiments of the present technology. The authorization system 200 may include a processor 210, an authorization generator 220, and a database 230, and authorization service client API 240. The authorization service client API 240 is described in more detail in FIG. 8 according to various embodiments. The authorization system 200 abstracts authorization of application objects as a service, and frees implementation to concentrate on business logic, while delegating authorization to the authorization system 200. The authorization system 200 is a Role-Based Access Control (RBAC) system. For example, permissions are based on organizational roles, not on application users. Organizational roles are assigned to users (e.g., end user 105), thus allowing end users (e.g., end user 105) to exercise object permissions associated with such organizational roles. The authorization system 200 is not an authentication system or service. The authorization system 200 does not authenticate or verify application users. For example, applications (e.g., the plurality of applications 122, 132, 142) may supply already authenticated users or groups of users that receive organizational role assignments.

In various embodiments the processor 210 is configured to receive information from the organization. For example, receiving, via the authorization service client API 240, identification of an asset for fine-grained role-based access control from an organization. For instance, receiving, via the authorization service client API 240, a definition of an asset type of the asset using the identification of the asset. For example, receiving, via the authorization service client API 240, a definition of an asset value of the asset based on the asset type. For instance, receiving, via the authorization service client API 240, a definition of an organizational role with fine-grained role-based access control to at least one of the asset, the asset type, and the asset value. The processor 210 may be further configured for receiving, via the authorization service client API 240, permissions for fine-grained role-based access by the organizational role to at least one of the asset, the asset type, and the asset value.

The processor 210 may comprise, or may be in communication with, media (for example, computer-readable media) that stores instructions that, when executed by the processor 210, cause the processor 210 to perform the elements described herein. Furthermore, the processor 210 may operate any operating system capable of supporting locally executed applications, cloud-based applications, and/or browser or browser-enabled applications.

In some embodiments the processor 210 may utilize the definition of an asset type, the definition of an asset value, and the definition of an organizational role to construct and generate a fine-grained role-based access control database schema using the asset, the definition of an asset type, the definition of an asset value, the definition of an organizational role, and the permissions for fine-grained role-based access by the organizational role to at least one of the asset, the asset type, and the asset value. The database 230 may be configured to store one or more of a fine-grained role-based access control database schema using the asset, the definition of an asset type, the definition of an asset value, the definition of an organizational role, and the permissions for fine-grained role-based access by the organizational role.

In some embodiments the authorization service client API 240 may be used for receiving, via an authorization service client API 240, a request for permission to access the asset by an authenticated user. For example, a request by the end user 105 to access the assets 195. Embodiments of the present technology are not an authentication system or service and the present technology may not authenticate or verify application users (e.g., end user 105). Applications may supply already authenticated users or groups that receive organizational role assignments.

In some embodiments, the processor 210 can also be used providing an authorization service user interface (UI) for enabling fine-grained role-based access control to the asset based on the fine-grained role-based access control database schema. For example, the User Interface (UI) 148 of FIG. 1. Additional details of the authorization service user interface (UI) are displayed and described in FIG. 7.

In some embodiments the processor 210 may be configured for fine-grained role-based access evaluating the request for permission to access the asset from the authenticated user using the fine-grained role-based access control database schema. The processor 210 may be configured for generating a fine-grained role-based access decision regarding the request for permission to access the asset, the asset type, and the asset value by the authenticated user based on the fine-grained role-based access evaluating. The processor 210 may be configured to reply to the request for permission to access at least one of the asset, the asset type, and the asset value by the authenticated user, via the authorization service client API 240, the fine-grained role-based access decision regarding the request for permission to access at least one of the asset, the asset type, and the asset value by the authenticated user.

In some embodiments the processor 210 may be configured for fine-grained role-based access evaluating the request for permission to access the asset from the authenticated user using the fine-grained role-based access control database schema. The authorization generator 220 may generate a fine-grained role-based access decision regarding the request for permission to access the asset, the asset type, and the asset value by the authenticated user based on the fine-grained role-based access evaluating. The processor 210 may further be configured to reply to the request for permission to access at least one of the asset, the asset type, and the asset value by the authenticated user, via the authorization service client API 240, the fine-grained role-based access decision regarding the request for permission to access at least one of the asset, the asset type, and the asset value by the authenticated user.

Figure 3:
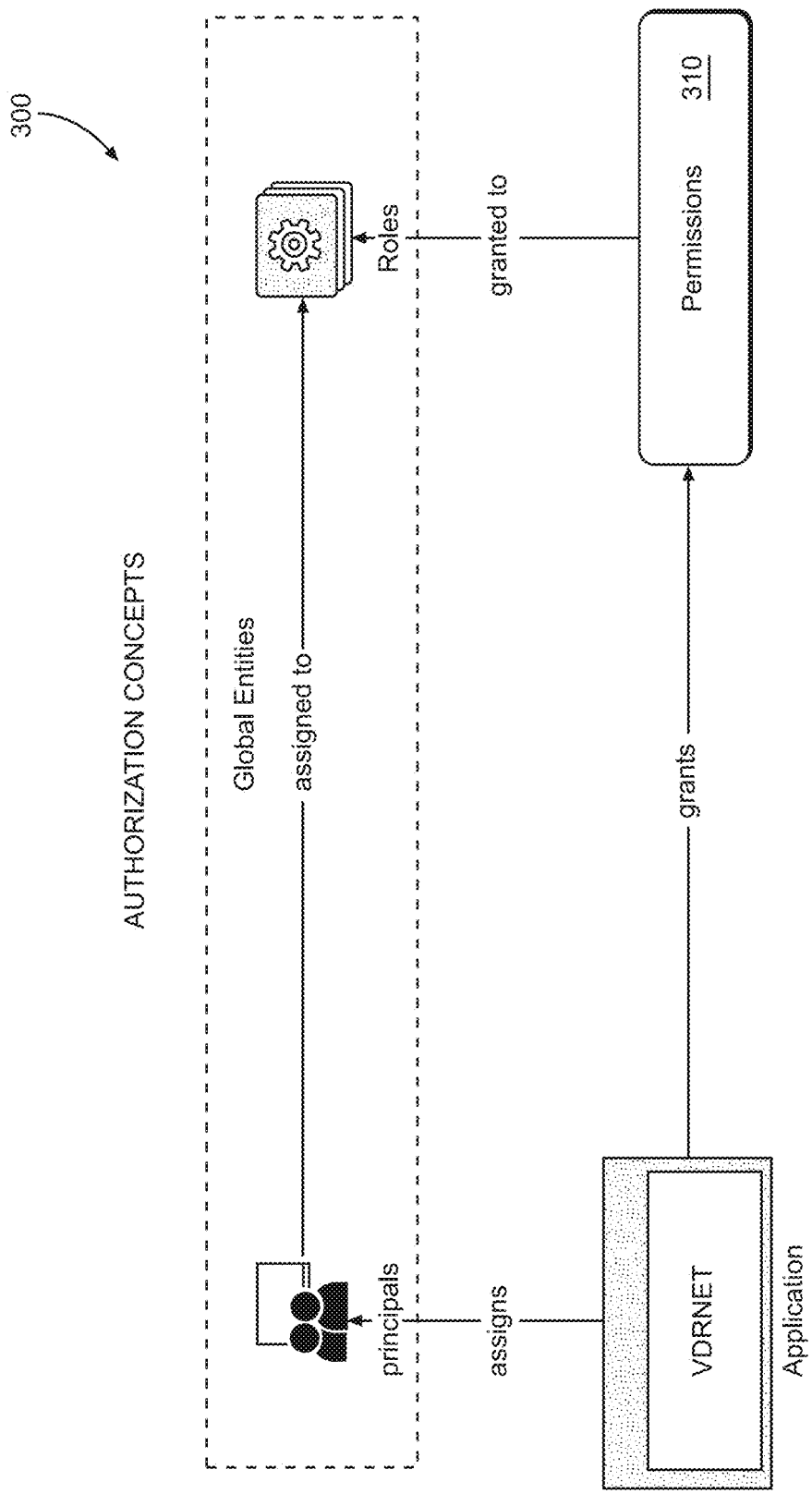
FIG. 3 illustrates a pictorial diagram of authorization concepts for enterprise-wide fine-grained role-based access control to a plurality of organizational assets, in accordance with exemplary embodiments of the present technology.

FIG. 3 illustrates a pictorial diagram of authorization concepts 300 for enterprise-wide fine-grained role-based access control to a plurality of organizational assets, in accordance with exemplary embodiments of the present technology. The pictorial diagram of authorization concepts 300 shows an application, principals of global entities, permissions 310, and roles (i.e., organizational role) of global entities. The application (e.g., the applications 122, 132, 142) may include asset types, assets, and asset values. The principals of global entities may be users (e.g., end user 105) or a group of users that are part of an organization. The roles (i.e., organizational role) may be organizational roles in the global entities such as a manager. The permissions 310 may be access control permissions (e.g., restricting, allowing) access of a user to an asset type using organizational role. Embodiments of the present technology enable enterprise-wide fine-grained role-based access control to a plurality of organizational assets.

Figure 4:
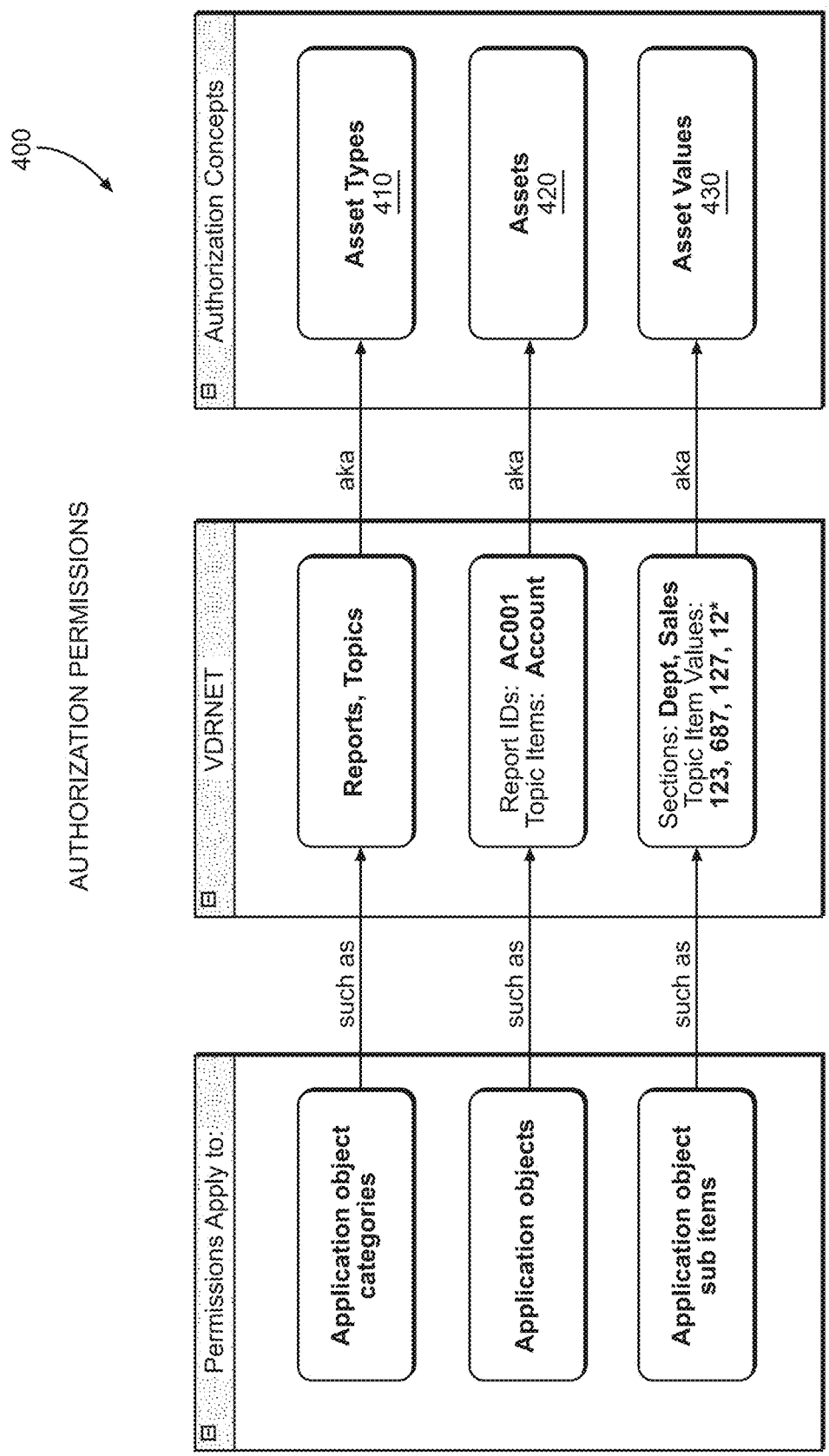
FIG. 4 is a pictorial diagram of authorization permissions for enterprise-wide fine-grained role-based access control to a plurality of organizational assets, in accordance with exemplary embodiments of the present technology.

FIG. 4 a pictorial diagram of authorization permissions 400 for enterprise-wide fine-grained role-based access control to a plurality of organizational assets, in accordance with exemplary embodiments of the present technology. The pictorial diagram of authorization permissions 400 shows examples of authorization concepts including more details of the permissions 310 of FIG. 3 including asset types 410, assets 420, and asset values 430. Asset types 410 include, for example, an asset type such as a report and permissions (e.g., restricting or allowing access) may apply to the application object categories. Assets 420 include, for example, an asset such as a report identification number (e.g., "AC001") and permissions (e.g., restricting or allowing access) may apply to application objects. Asset values 430 include, for example, an asset value such as a specific kind of report (e.g., sales report) or specific page numbers in a report (e.g., page number XXX) and permissions (e.g., restricting or allowing access) may apply to the application object sub-items.

Figure 5:
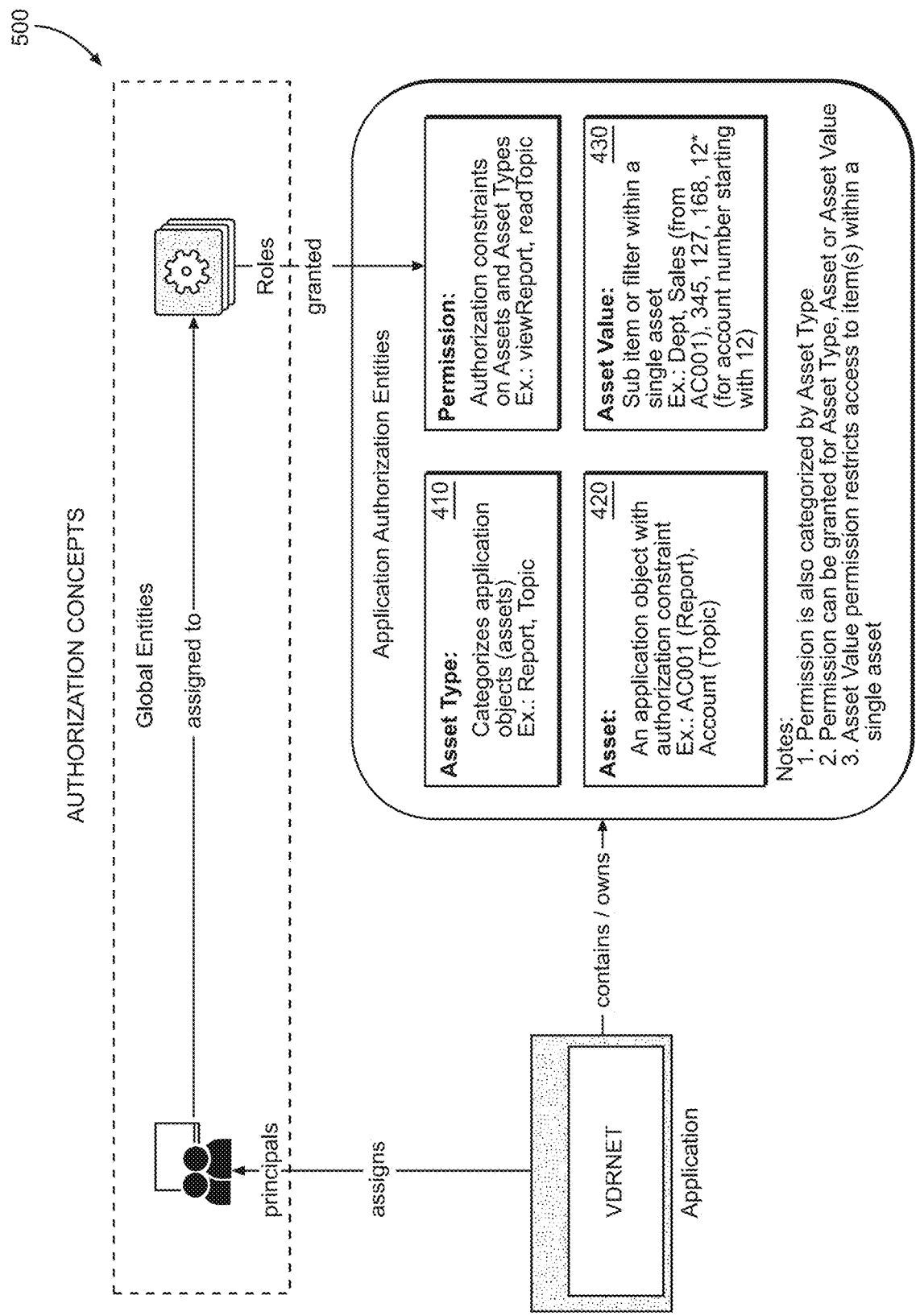
FIG. 5 illustrates a pictorial diagram of authorization concepts including application authorization entities for enterprise-wide fine-grained role-based access control to a plurality of organizational assets, in accordance with exemplary embodiments of the present technology.

FIG. 5 illustrates a pictorial diagram of authorization concepts 500 including application authorization entities for enterprise-wide fine-grained role-based access control to a plurality of organizational assets, in accordance with exemplary embodiments of the present technology. The pictorial diagram of authorization concepts 500 shows an application, principals of global entities, roles in the global entities, and permissions. The application (e.g., the plurality of applications 122, 132, 142) may be categorized by asset types 410, assets 420, and asset values 430. The principals of global entities may be users (e.g., end user 105) or a group of users that are part of an organization. The roles may be organizational roles in the global entities. The permissions may be access control permissions (e.g., restricting, allowing) access of a user access based on organizational role using asset type 410, asset 420, and/or asset value 430. Embodiments of the present technology enable enterprise-wide fine-grained role-based access control to a plurality of organizational assets.

In various embodiments assets are application objects (i.e. application assets). A user decides which application assets to control (e.g., restrict, allow) access through authorization constraints. Embodiments of the present technology include an authorization service for fine-grained role-based access control that maintains records of all constraints placed by a user on application assets and makes the fine-grained role-based access control available on demand for the organization. The application of an organization enforces the fine-grained role-based access control for the application assets.

In some embodiments of the present technology assets may be categorized by types (e.g., asset type). The asset type defined by the user helps categorize the operations permissible for the asset. For example, a user may execute one asset type but not a different asset type. For instance, a user may execute a task but not a topic. In another instance, a user may read a topic but a task. For example, a user may provide asset type categories for an application. Embodiments of the present technology include an authorization service for fine-grained role-based access control that maintains a record of asset types defined by a user and the corresponding permissible operations for the asset types.

FIG. 6 illustrates a process flow diagram showing a method for enterprise-wide fine-grained role-based access control to a plurality of organizational assets, in accordance with exemplary embodiments of the present technology. In some embodiments the present technology is directed to a system of one or more computers which can be configured to perform particular operations or actions by virtue of having software, firmware, hardware, or a combination thereof installed on the system that in operation causes or cause the system to perform actions and/or method steps as described herein.

As shown in FIG. 6, the method 600 may commence at operation 605, receiving, via an authorization service client API, identification of an asset for fine-grained role-based access control from an organization. For example, the authorization service client API 240 is described in more detail in FIG. 8 according to various embodiments.

At operation 610, the method 600 may proceed with receiving, via the authorization service client API, a definition of an asset type of the asset using the identification of the asset.

At operation 615, the method 600 may include receiving, via the authorization service client API, a definition of an asset value of the asset based on the asset type.

At operation 620, the method 600 may proceed with receiving, via the authorization service client API, a definition of an organizational role with fine-grained role-based access control to at least one of the asset, the asset type, and the asset value.

At operation 625, the method 600 may include receiving, via the authorization service client API, permissions for fine-grained role-based access by the organizational role to at least one of the asset, the asset type, and the asset value.

At operation 630, the method 600 may proceed generating a fine-grained role-based access control database schema using the asset, the definition of an asset type, the definition of an asset value, the definition of an organizational role, and the permissions for fine-grained role-based access by the organizational role to at least one of the asset, the asset type, and the asset value.

At operation 635, the method 600 may include providing an authorization service user interface (UI) for enabling fine-grained role-based access control to the asset based on the fine-grained role-based access control database schema. For example, the authorization service user interface (UI) may be User Interface (UI) 148 of FIG. 1. For instance, the authorization service user interface (UI) displayed in FIG. 7.

At operation 640, the method 600 may include receiving, via an authorization service client API, a request for permission to access at least one of the asset, the asset type, and the asset value by an authenticated user.

Figure 7:
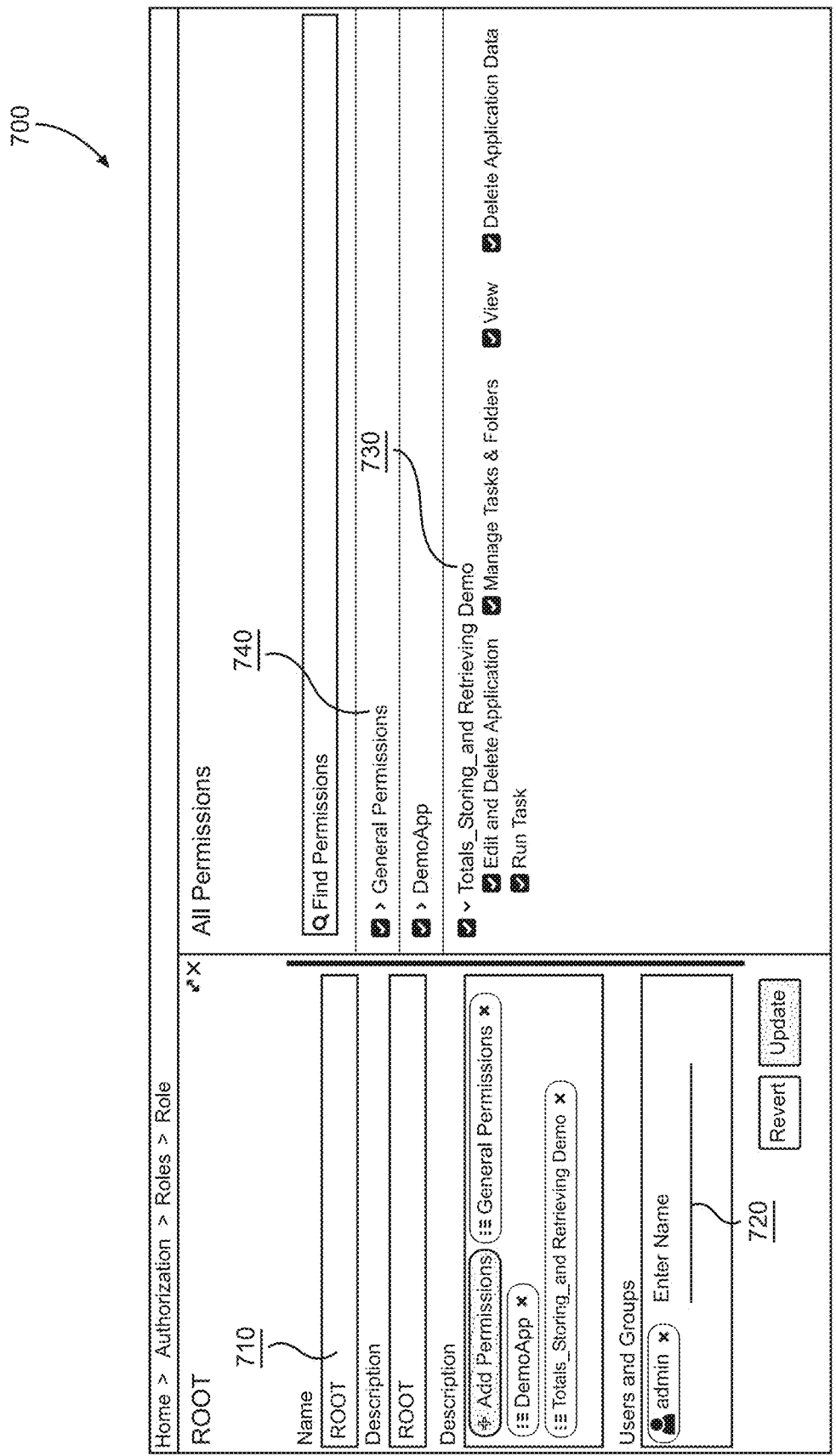
FIG. 7 illustrates an authorization service user interface (UI) for enabling enterprise-wide fine-grained role-based access control to a plurality of organizational assets, in accordance with exemplary embodiments of the present technology.

FIG. 7 illustrates an authorization service user interface (UI) 700 for enabling enterprise-wide fine-grained role-based access control to a plurality of organizational assets, in accordance with exemplary embodiments of the present technology. The authorization service user interface (UI) 700 is for enabling fine-grained role-based access control to an asset.

Various embodiments of the present technology include the authorization service user interface (UI) 700 for enabling fine-grained role-based access control to an asset. For example, 710 shows receiving, via the authorization service user interface (UI) 700, the selection input of the organizational role, which is a root user. In some instances, the selection input of permissions for fine-grained role-based access by the root user includes permission to access all asset types and asset values. For example, 720 shows receiving, via the authorization service user interface (UI) 700, selection input of an organizational role with fine-grained role-based access control to at least one of the asset, the asset type, and the asset value. In some instances, the receiving, via the authorization service user interface (UI) 700, the selection input of the organizational role with fine-grained role-based access control to at least one of the asset, the asset type, and the asset value comprises multiple organizational roles (e.g. a group). For example, 730 shows receiving, via the authorization service user interface (UI) 700, selection input of an asset for fine-grained role-based access control using the identification of an asset; receiving, via the authorization service user interface (UI) 700, selection input of an asset type of the asset using the definition of the asset type of the asset; and receiving, via the authorization service user interface (UI) 700, selection input of an asset value of the asset using the definition of the asset value of the asset. For example, 740 shows receiving, via the authorization service user interface (UI) 700, selection input of permissions for fine-grained role-based access by the organizational role to at least one of the asset, the asset type, and the asset value.

FIG. 8 illustrates documentation 800 of an authorization service client API for enterprise-wide fine-grained role-based access control to a plurality of organizational assets, in accordance with exemplary embodiments of the present technology. The documentation 800 of FIG. 8 shows a permission template for registration 810 and an example 820 thereof. For example, the documentation 800 of an authorization service client API may describe the authorization service client API 240 of FIG. 2 in various embodiments.

Figure 9:
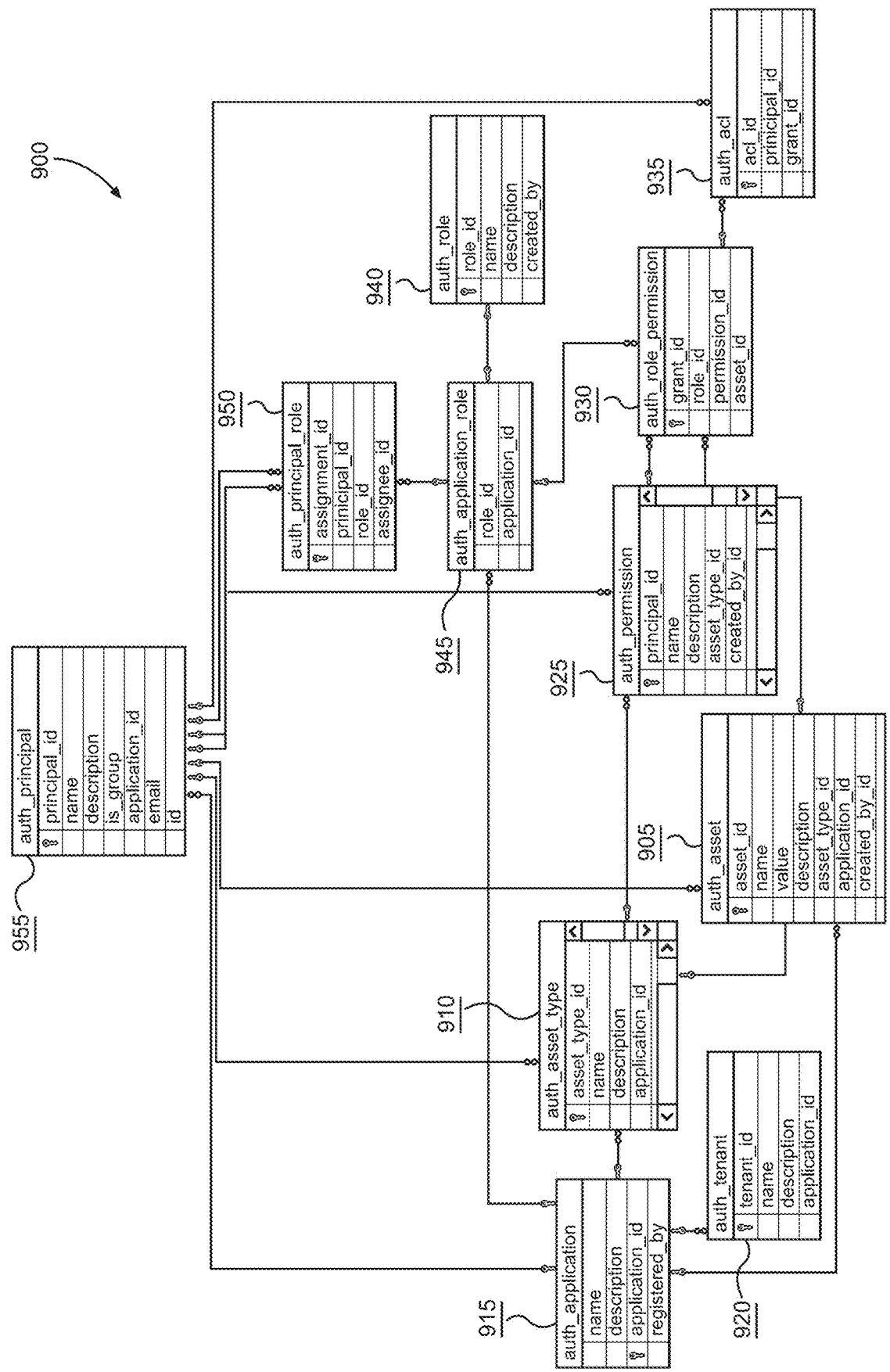
FIG. 9 shows a fine-grained role-based access control database schema for enterprise-wide fine-grained role-based access control to a plurality of organizational assets, in accordance with exemplary embodiments of the present technology.

FIG. 9 shows a fine-grained role-based access control database schema 900 for enterprise-wide fine-grained role-based access control to a plurality of organizational assets, in accordance with exemplary embodiments of the present technology. The exemplary fine-grained role-based access control database schema 900 comprises authorization asset 905, authorization asset type 910, authorization application 915, authorization tenant 920, authorization permission 925, authorization role permission 930, authorization Access Control List (ACL) 935, authorization role 940, authorization application role 945, authorization principal role 950, authorization principal 955.

Embodiments of the present technology include fine-grained role-based access evaluating the request for permission to access the asset from the authenticated user using the fine-grained role-based access control database schema 900, and generating a fine-grained role-based access decision regarding the request for permission to access the asset, the asset type, and the asset value by the authenticated user based on the fine-grained role-based access evaluating. Some embodiments include replying to the request for permission to access at least one of the asset, the asset type, and the asset value by the authenticated user, via the authorization service client API, the fine-grained role-based access decision regarding the request for permission to access at least one of the asset, the asset type, and the asset value by the authenticated user.

Figure 10:
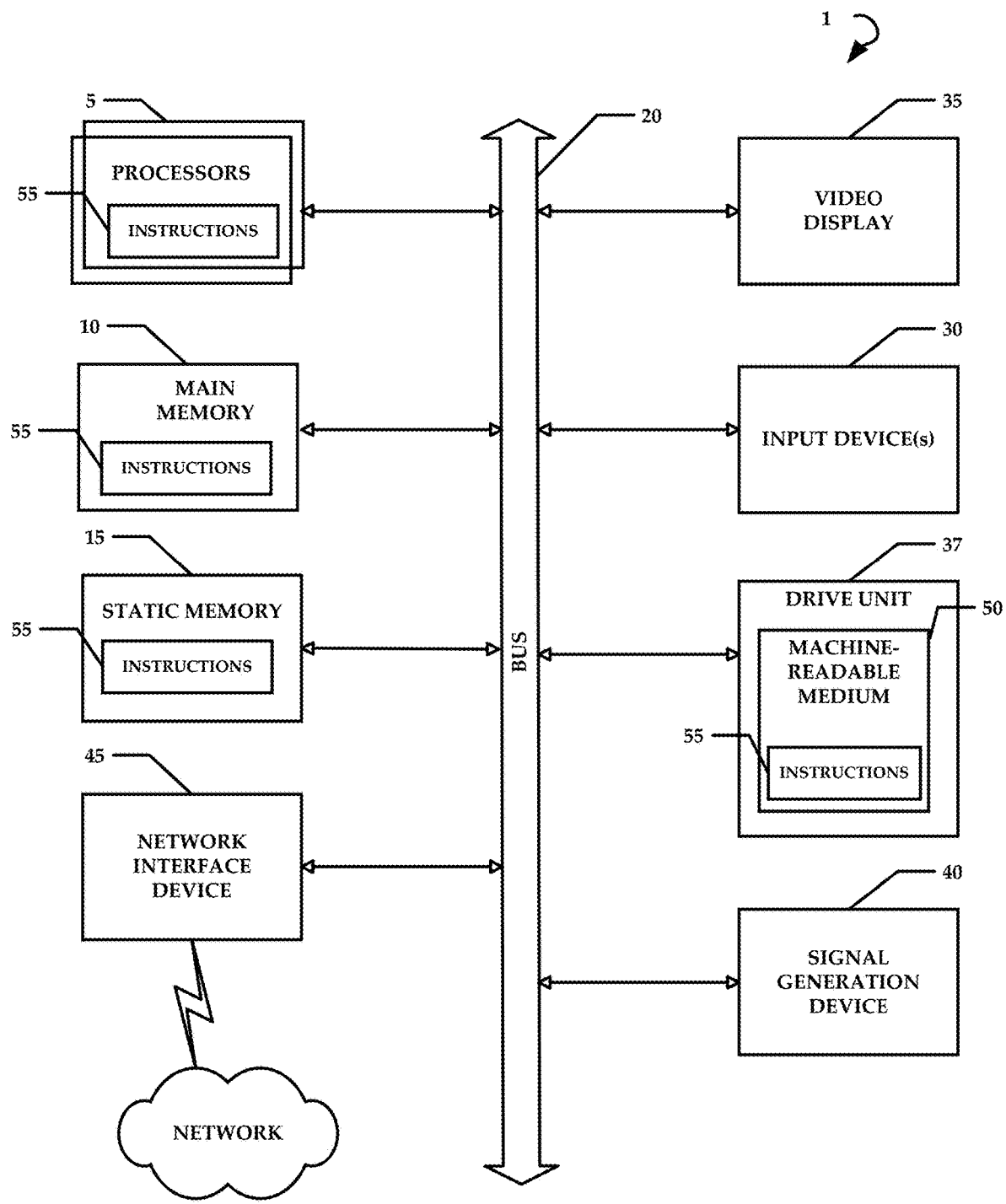
FIG. 10 illustrates an exemplary computer system that may be used to implement embodiments of the present disclosure.

FIG. 10 illustrates an exemplary computer system that may be used to implement embodiments of the present disclosure. FIG. 10 illustrates a computer system for implementing systems and methods according to exemplary embodiments of the present technology. FIG. 10 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 are those typically found in computer systems that may be suitable for use with embodiments of the present disclosure and are intended to represent a broad category of such computer components that are well known in the art. Thus, the computer system 1 can be a personal computer (PC), handheld computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for enterprise-wide fine-grained role-based access control to a plurality of organizational assets, the method comprising:

receiving, via an authorization service client Application Programming Interface (API), identification of an asset for fine-grained role-based access control from an organization;

receiving, via the authorization service client API, a definition of an asset type of the asset using the identification of the asset;

receiving, via the authorization service client API, a definition of an asset value of the asset based on the asset type;

receiving, via the authorization service client API, a definition of an organizational role with fine-grained role-based access control to at least one of the asset, the asset type, and the asset value;

receiving, via the authorization service client API, permissions for fine-grained role-based access by the organizational role to at least one of the asset, the asset type, and the asset value, the permissions comprising at least one access rule having a set of variables based on the asset, the asset type, and the asset value;

generating a fine-grained role-based access control database schema using the asset, the definition of an asset type, the definition of an asset value, the definition of an organizational role, and the permissions for fine-grained role-based access by the organizational role to at least one of the asset, the asset type, and the asset value;

providing an authorization service user interface (UI) for enabling fine-grained role-based access control to the asset based on the fine-grained role-based access control database schema;

receiving, via the authorization service client API, a request for permission to access at least one of the asset, the asset type, and the asset value by an authenticated user;

receiving, via the UI, selection input of an asset for fine-grained role-based access control using the identification of an asset;

receiving, via the UI, selection input of an asset type of the asset using the definition of the asset type of the asset;

receiving, via the UI, selection input of an asset value of the asset using the definition of the asset value of the asset;

receiving, via the UI, selection input of an organizational role with fine-grained role-based access control to at least one of the asset, the asset type, and the asset value; and receiving, via the UI, selection input of the permissions for fine-grained role-based access by the organizational role to at least one of the asset, the asset type, and the asset value, the receiving, via the UI, the selection input of the organizational role is a root user; and the receiving, via the UI, the selection input of the permissions for fine-grained role-based access by the root user includes permissions to access all asset types and asset values.

2. The method as recited in claim 1, further comprising:

fine-grained role-based access evaluating the request for permission to access the asset from the authenticated user using the fine-grained role-based access control database schema;

generating a fine-grained role-based access decision regarding the request for permission to access the asset, the asset type, and the asset value by the authenticated user based on the fine-grained role-based access evaluating; and replying to the request for permission to access at least one of the asset, the asset type, and the asset value by the authenticated user, via the authorization service client API based on the fine-grained role-based access decision regarding the request for permission to access at least one of the asset, the asset type, and the asset value by the authenticated user.

3. The method as recited in claim 2, wherein the replying to the request for permission to access at least one of the asset, the asset type, and the asset value by the authenticated user comprises granting permission to access at least one of the asset, the asset type, and the asset value by the authenticated user.

4. The method as recited in claim 2, wherein the replying to the request for permission to access at least one of the asset, the asset type, and the asset value by the authenticated user comprises denial of permission to access at least one of the asset, the asset type, and the asset value by the authenticated user.

5. The method as recited in claim 1,
wherein the receiving, via the UI, the selection input of the organizational role with fine-grained role-based access control to at least one of the asset, the asset type, and the asset value comprises multiple organizational roles.

6. A system for enterprise-wide fine-grained role-based access control to a plurality of organizational assets, the system comprising:
at least one processor, and
a memory storing processor-executable instructions, wherein the at least one processor is configured to implement the following operations upon executing the processor-executable instructions:
receiving, via an authorization service client Application Programming Interface (API), identification of an asset for fine-grained role-based access control from an organization;
receiving, via the authorization service client API, a definition of an asset type of the asset using the identification of the asset;
receiving, via the authorization service client API, a definition of an asset value of the asset based on the asset type;
receiving, via the authorization service client API, a definition of an organizational role with fine-grained role-based access control to at least one of the asset, the asset type, and the asset value;
receiving, via the authorization service client API, permissions for fine-grained role-based access by the organizational role to at least one of the asset, the asset type, and the asset value, the permissions comprising at least one access rule having a set of variables based on the asset, the asset type, and the asset value;
generating a fine-grained role-based access control database schema using the asset, the definition of an asset type, the definition of an asset value, the definition of an organizational role, and the permissions for fine-grained role-based access by the organizational role to at least one of the asset, the asset type, and the asset value;
providing an authorization service user interface (UI) for enabling fine-grained role-based access control to the asset based on the fine-grained role-based access control database schema;

receiving, via the authorization service client API, a request for permission to access at least one of the asset, the asset type, and the asset value by an authenticated user;
receiving, via the UI, selection input of an asset for fine-grained role-based access control using the identification of an asset;
receiving, via the UI, selection input of an asset type of the asset using the definition of the asset type of the asset;
receiving, via the UI, selection input of an asset value of the asset using the definition of the asset value of the asset;
receiving, via the UI, selection input of an organizational role with fine-grained role-based access control to at least one of the asset, the asset type, and the asset value; and
receiving, via the UI, selection input of the permissions for fine-grained role-based access by the organizational role to at least one of the asset, the asset type, and the asset value, the receiving, via the UI, the selection input of the organizational role is a root user; the receiving, via the UI, selection input of the permissions for fine-grained role-based access by the root user includes permissions to access all asset types and asset values.

7. The system as recited in claim 6, wherein the at least one processor is further configured to implement the following operations upon executing the processor-executable instructions:
fine-grained role-based access evaluating the request for permission to access the asset from the authenticated user using the fine-grained role-based access control database schema;
generating a fine-grained role-based access decision regarding the request for permission to access the asset, the asset type, and the asset value by the authenticated user based on the fine-grained role-based access evaluating; and
replying to the request for permission to access at least one of the asset, the asset type, and the asset value by the authenticated user, via the authorization service client API based on the fine-grained role-based access decision regarding the request for permission to access at least one of the asset, the asset type, and the asset value by the authenticated user.

8. The system as recited in claim 7, wherein the replying to the request for permission to access at least one of the asset, the asset type, and the asset value by the authenticated user comprises granting permission to access at least one of the asset, the asset type, and the asset value by the authenticated user.

9. The system as recited in claim 7, wherein the replying to the request for permission to access at least one of the asset, the asset type, and the asset value by the authenticated user comprises denial of permission to access at least one of the asset, the asset type, and the asset value by the authenticated user.

10. The system as recited in claim 6,
wherein the receiving, via the UI, selection input of an organizational role with fine-grained role-based access control to at least one of the asset, the asset type, and the asset value comprises multiple organizational roles.

11. A non-transitory computer readable medium having embodied thereon instructions being executable by at least one processor to perform operations for enterprise-wide fine-grained role-based access control to a plurality of organizational assets, the operations comprising:

receiving, via an authorization service client Application Programming Interface (API), identification of an asset for fine-grained role-based access control from an organization;

receiving, via the authorization service client API, a definition of an asset type of the asset using the identification of the asset;

receiving, via the authorization service client API, a definition of an asset value of the asset based on the asset type;

receiving, via the authorization service client API, a definition of an organizational role with fine-grained role-based access control to at least one of the asset, the asset type, and the asset value;

receiving, via the authorization service client API, permissions for fine-grained role-based access by the organizational role to at least one of the asset, the asset type, and the asset value, the permissions comprising at least one access rule having a set of variables based on the asset, the asset type, and the asset value;

generating a fine-grained role-based access control database schema using the asset, the definition of an asset type, the definition of an asset value, the definition of an organizational role, and the permissions for fine-grained role-based access by the organizational role to at least one of the asset, the asset type, and the asset value;

providing an authorization service user interface (UI) for enabling fine-grained role-based access control to the asset based on the fine-grained role-based access control database schema;

receiving, via the authorization service client API, a request for permission to access at least one of the asset, the asset type, and the asset value by an authenticated user;

receiving, via the UI, selection input of an asset for fine-grained role-based access control using the identification of an asset;

receiving, via the UI, selection input of an asset type of the asset using the definition of the asset type of the asset;

receiving, via the UI, selection input of an asset value of the asset using the definition of the asset value of the asset;

receiving, via the UI, selection input of an organizational role with fine-grained role-based access control to at least one of the asset, the asset type, and the asset value; and receiving, via the UI, selection input of the permissions for fine-grained role-based access by the organizational role to at least one of the asset, the asset type, and the asset value, the receiving, via the UI, the selection input of the organizational role is a root user; and the receiving, via the UI, the selection input of the permissions for fine-grained role-based access by the root user includes permissions to access all asset types and asset values.

12. The non-transitory computer readable medium of claim 11, wherein the operations further comprise:

fine-grained role-based access evaluating the request for permission to access the asset from the authenticated user using the fine-grained role-based access control database schema;

generating a fine-grained role-based access decision regarding the request for permission to access the asset, the asset type, and the asset value by the authenticated user based on the fine-grained role-based access evaluating; and replying to the request for permission to access at least one of the asset, the asset type, and the asset value by the authenticated user, via the authorization service client API based on the fine-grained role-based access decision regarding the request for permission to access at least one of the asset, the asset type, and the asset value by the authenticated user.

13. The non-transitory computer readable medium of claim 12, wherein the replying to the request for permission to access at least one of the asset, the asset type, and the asset value by the authenticated user comprises granting permission to access at least one of the asset, the asset type, and the asset value by the authenticated user.

14. The non-transitory computer readable medium of claim 12, wherein the replying to the request for permission to access at least one of the asset, the asset type, and the asset value by the authenticated user comprises denial of permission to access at least one of the asset, the asset type, and the asset value by the authenticated user.

* * * * *